United States Patent [19]

St-Germain

[11] Patent Number: 4,457,509

[45] Date of Patent: Jul. 3, 1984

[54] LEVITATIONARIUM FOR AIR FLOTATION OF HUMANS

[75] Inventor: Jean St-Germain, St. Simon, Canada

[73] Assignee: Airflite, Inc., Las Vegas, Nev.

[21] Appl. No.: 381,594

[22] Filed: May 24, 1982

Related U.S. Application Data

[63] Continuation-in-part of Ser. No. 240,811, Mar. 5, 1981, abandoned.

[51] Int. Cl.³ .................. G01M 9/00; A63B 71/02; A63G 31/16
[52] U.S. Cl. .................................... 272/2; 73/147; 434/258
[58] Field of Search .............. 272/2, 3, 6, 1 R, 7, 272/24, 26, 71; 73/147, DIG. 8, 168; 434/126, 247, 254, 433, 258

[56] References Cited

U.S. PATENT DOCUMENTS

| | | | |
|---|---|---|---|
| 1,811,364 | 6/1931 | Olshevsky | 73/147 |
| 1,940,790 | 12/1933 | Diehl | 73/147 UX |
| 2,158,894 | 5/1939 | Brintzinger | 73/147 |
| 2,357,625 | 9/1944 | Armbruster | 73/147 X |
| 3,484,953 | 12/1969 | Norheim, Jr. | 434/258 |

FOREIGN PATENT DOCUMENTS 635609  4/1950  United Kingdom .................. 73/147

Primary Examiner—Richard T. Stouffer
Assistant Examiner—Arnold W. Kramer
Attorney, Agent, or Firm—Millen & White

[57] ABSTRACT

An installation such as in the form of a building having a room or chamber in which an upward air flow is produced to levitate human beings. This installation, herein called a levitationarium, is constructed and arranged to be simple, safe and economic to operate in particular by comprising a blowing propeller that is shrouded and arranged to produce an induced suction flow in an annular air passage around it, under the action of the direct flow by the propeller inside the shroud; by having a toroidal air passage arranged for closed circuit streamline air flow serially through it and the levitation chamber; and by including a toroidal core portion interposed between the levitation chamber and the toroidal air passage and providing a spectator gallery and access to the levitation chamber.

16 Claims, 9 Drawing Figures

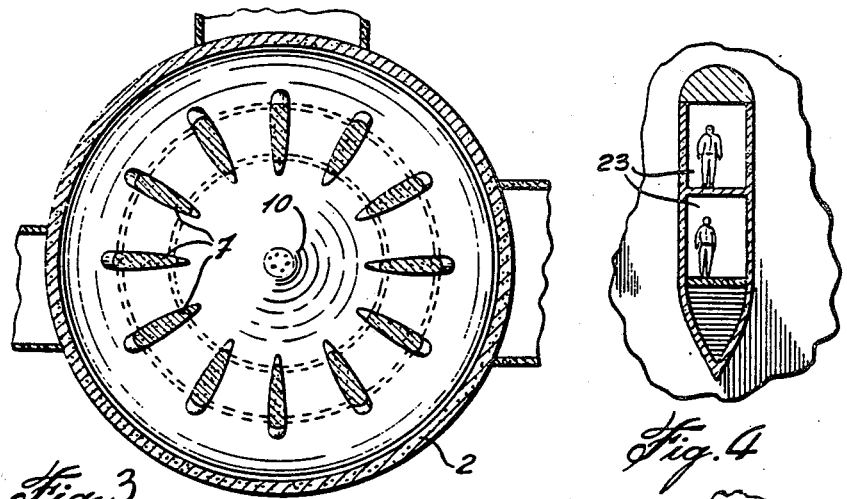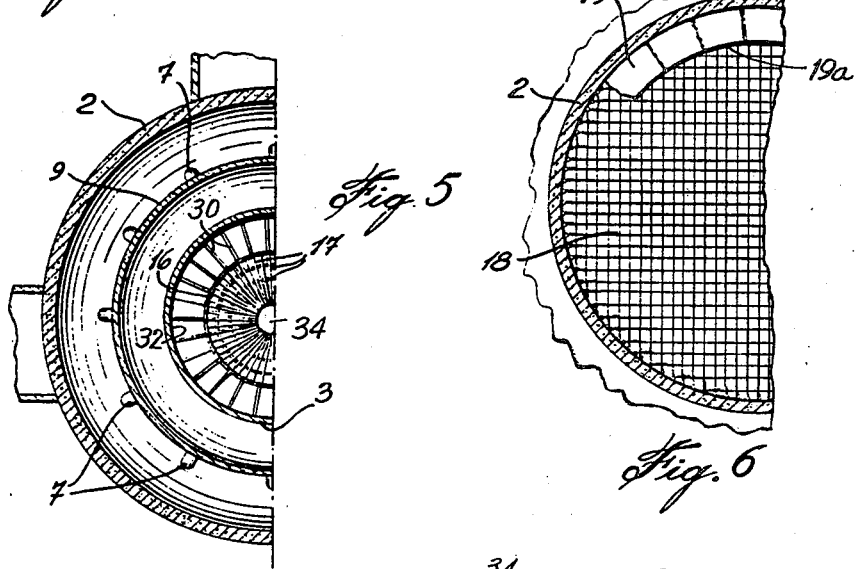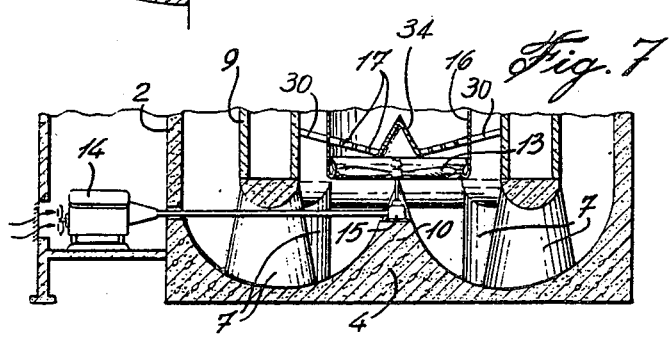

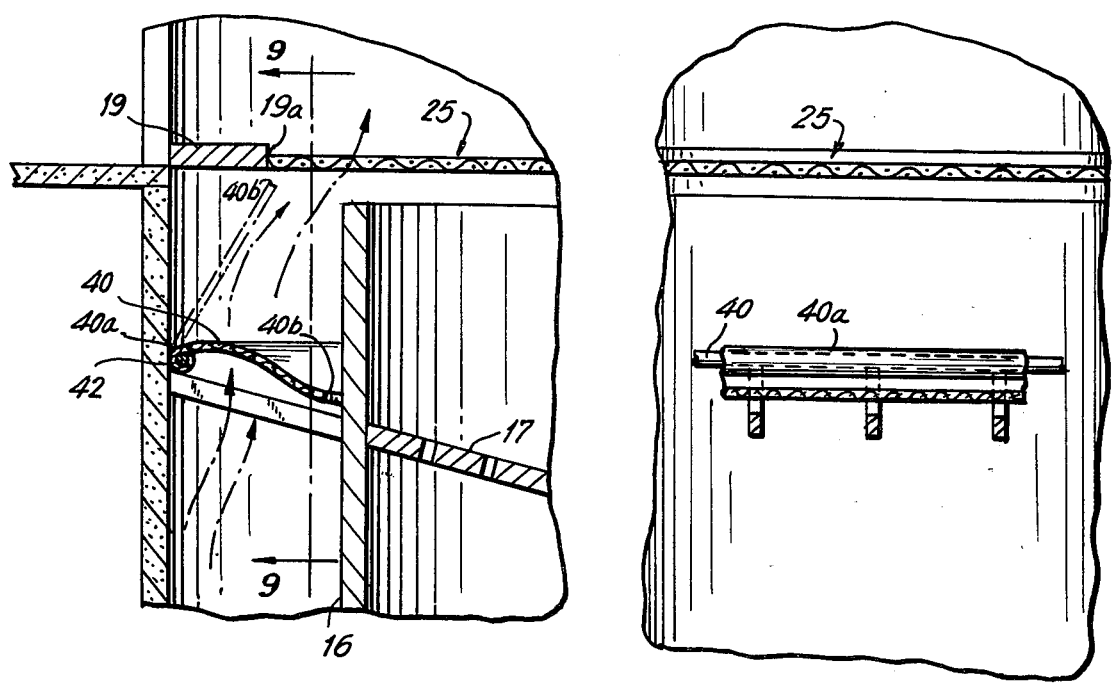

LEVITATIONARIUM FOR AIR FLOTATION OF HUMANS

CROSS REFERENCE TO RELATED APPLICATION

This application is a continuation-in-part application of U.S. patent application Ser. No. 06/240,811, filed Mar. 5, 1981 and now abandoned.

BACKGROUND OF THE INVENTION

This invention relates to an installation to levitate human beings by an upward flow of air, and in particular, to a levitationarium in which air flotation of humans is produced, either for the sole fun and enjoyment of users and spectators or for training, such as to practice free fall by parachutists.

SUMMARY OF THE INVENTION

It is a general object of the present invention to provide a levitationarium of the above type.

It is another general object of the present invention to provide a levitationarium of the above type that is simple, safe and economic to operate.

It is a more specific object of the present invention to provide a levitationarium of the above type, wherein the air blowing requirement and associated power requirement are minimized by appropriate construction and arrangement of the air blowing propeller relative to the levitation chamber.

It is a still more specific object of the present invention to provide a levitationarium of the above type, wherein an air blowing propeller is shrouded and surrounded by an annular air passage to advantageously use the air flow by the propeller inside the shroud directly and also to produce an induced suction flow in that air passage around the shroud.

Still other objects and advantages of the invention will in part be obvious and will in part be apparent from the specification.

The present invention defines an installation such as in the form of a building having a room or chamber in which an upward air flow is produced to levitate human beings. This installation, herein called a levitationarium, is constructed and arranged to be simple, safe and economic to operate in particular by comprising a blowing propeller that is shrouded and arranged to produce an induced suction flow in an annular air passage around it, under the action of direct flow by the propeller inside the shroud; by having a toroidal air passage arranged for closed circuit streamline air flow serially through it and the levitation chamber; and by including a toroidal core portion interposed between the levitation chamber and the toroidal air passage and providing a spectator-gallery and access to the levitation chamber.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

The above and other objects and advantages of the present invention will be better understood with reference to the following detailed description of preferred embodiments thereof which is illustrated, by way of example, in the accompanying drawings, in which:

FIGS. 2, 3, 4 and 5 are cross-sectional views as seen along lines, 2—2, 3—3, 4—4, and 5—5, respectively in FIG. 1;

FIG. 6 is an enlarged scale view of the center of FIG. 2;

FIG. 7 is a cross-sectional view as seen along line 7—7 in FIG. 2 and particularly illustrating an air blower system according to the present invention;

FIG. 8 is a fragmentary cross-sectional view of an alternative embodiment of the lower portion of the levitation chamber proximate the walkway thereof; and FIG. 9 is a cross-sectional view taken along line 9—9 of FIG. 8.

DESCRIPTION OF THE PREFERRED EMBODIMENTS

Figure 1:
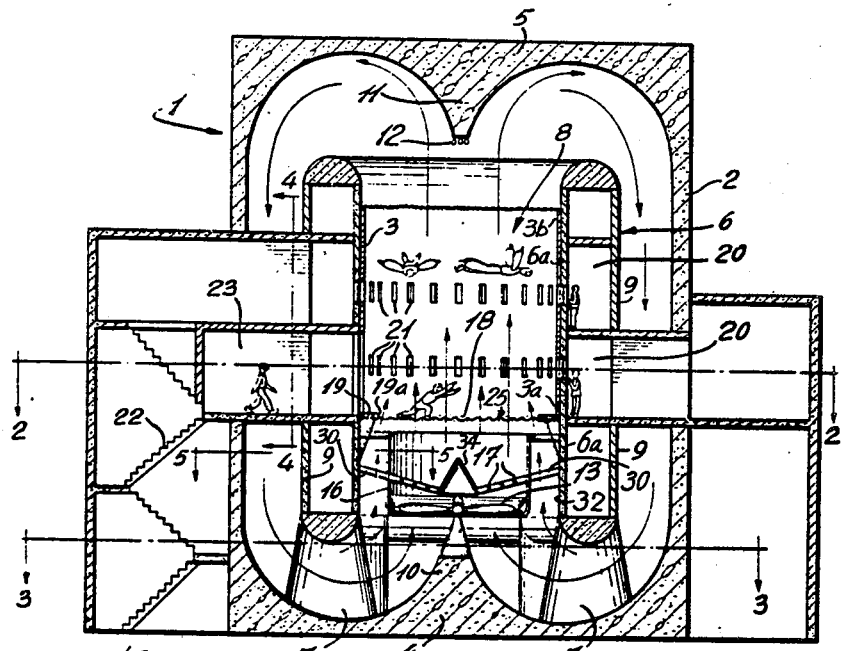
FIG. 1 is a cross-sectional view in elevation of a levitationarium for air flotation of humans according to the present invention.
Figure 2:
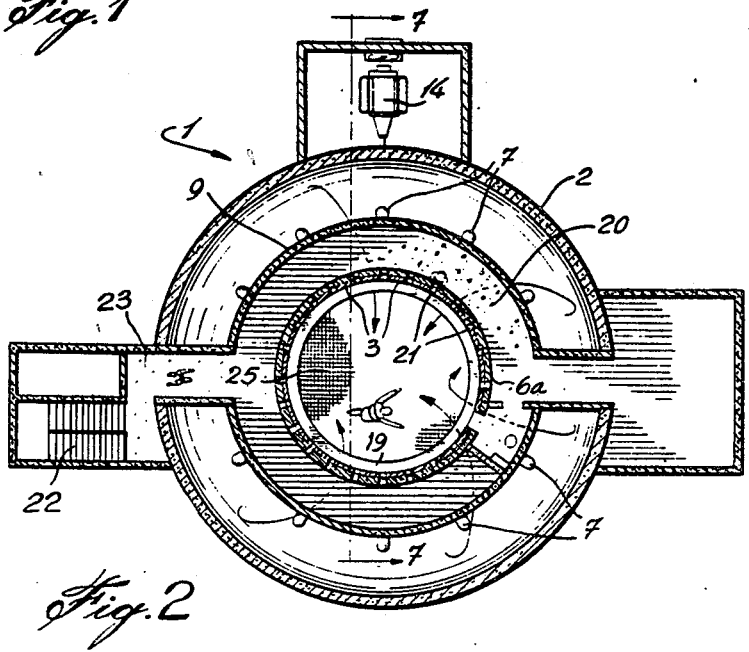

The illustrated levitationarium comprises a housing 1, in this case in the form of a building having a generally cylindrical outline. The housing 1 includes a cylindrical outer lateral wall 2 coaxial with a cylindrical inner wall 3. It is noted that the outer lateral wall 2 and inner lateral wall 3 may have other geometrical shapes, such as being octagonal. The present invention should not be construed as limited to cylindrical configurations, wherever mentioned. The outer wall 2 is integrally formed with a base 4 and a roof 5, all of concrete. The building 1 is formed with a toroidal chamber in which is mounted a core 6 of toroidal shape.

The toroidal core 6 includes an inner cylindrical wall 6a and an outer cylindrical wall 9, although, as aforenoted, other shapes can be utilized. The inner wall 6a of the toroidal core 6 is internally coated with a shock-absorbing lining to form with it the inner wall 3. The toroidal core 6 is supported on a plurality of posts 7 that are radially streamlined for uniform streamline air flow between them. The inner wall 3 of housing 1 encloses a levitation chamber 8 and is open at its bottom and top to form a lower inlet end 3a and a top outlet end 3b. The internal space in the housing 1 forms a toroidal air passage extending between the top outlet end 3b and the bottom inlet end 3a of the levitation chamber 8 and passing between the outer wall 9 of the core 6 and the inner surface of outer wall 2 of the building 1. That toroidal air passage thus allows closed circuit air flow serially with upright air flow in the levitation chamber.

To produce an appropriate smooth or streamlined air flow, the base 4 and the roof 5 are formed with an inward axial projection 10 and 11, respectively. Advantage is taken of the top inward axial projection to secure light projectors 12 and possibly other utility items such as air flow meters, not shown. On the bottom inward axial projection 10, there is mounted an air blower in the form of an air blowing propeller 13. Propeller 13 is mounted coaxially with the levitation chamber 8 below the bottom thereof and is driven by a motor 14 through a gearbox 15. The propeller 13 is surrounded by a cylindrical shroud 16, although not limited to this shape, supported by a plurality of radially extending struts 30 which extend between inner wall 6a of core 6 and shroud 16. Shroud 16 is diametrically smaller than the inner wall 3 to define an annular air passage 32 between them. The air blowing propeller 13 produces suction on the air in the aforementioned air passage 32 and, thus, an additional upward air flow, or suction air flow, in addition to its own upwardly directed air flow through shroud 16. Thus, the relatively smaller propeller 13 requires a substantially smaller engine 14 than if the same flow was all produced only by direct flow through a large propeller. Shroud 16 also acts to reduce noise caused by propeller 13 and the air flow created thereby.

A grid or grille 17 is secured in shroud 16 below the levitation chamber above the propeller 13. Grille 17 is substantially V-shaped in cross-section. Since grille 17 is sloped towards the center of propeller 13, it inwardly deflects the air flow produced directly by propeller 13. A cone shaped member 34 is provided on grille 17 directly above propeller 13 on the axis of rotation thereof. Member 34 allows for uniform air flow and prevents turbulence due to the dead air space directly above the center of propeller 13.

A take-off and landing base 25 overlies the shrouded propeller and includes a grating 18, of any suitable material such as a net, to support standing users while allowing upward air flow therethrough. The take-off and landing base 25 also includes an air-impervious peripheral walkway 19 on which people can stand substantially clear of the upward air flow and from which they can dive toward the center of the chamber to be lifted by the air flow and float, as shown in FIG. 1.

In order to prevent turbulence and interfering air currents from forming proximate the edge 19a of walkway 19, in an alternative embodiment depicted in FIGS. 8 and 9, a deflector 40 is provided. Deflector 40 is preferably a deformable material such as canvas. A circular rod 42 is secured against wall 6a of toroidal core 6 above struts 30. Canvas deflector 40 is annular in shape and includes an outer edge 40a and an inner edge 40b. Outer edge 40a is secured to ring 42 preferably by wrapping it around ring 42 and stitching to canvas deflector 40. Inner edge 40b is free.

When air is flowing up through air passage 32 due to the air current created by propeller 13, deflector 40 will be forced up in the direction of the arrow shown A and will assume the position depicted in phantom in FIG. 8. The inner edge 40b of deflector 40 will extend slightly inwardly of walkway 19. The sloped wall defined by deflector 40 prevents turbulence at walkway 19 and allows for the smooth flow of air therepast. When propeller 13 is at rest, deflector 40 will relax and assume the full line position substantially as depicted in FIG. 8.

The core 6 forms superposed annular galleries 20 in which spectators may be allowed to watch the users through windows 21 in the wall 3. Appropriate stairways 22 and passages 23 are provided to give access to the inner levitation chamber through the toroidal surrounding portion of the building 1. The top and bottom of each internally-extending portion of the building, such as of the core 6 and passages 23, are curved and streamlined at their top and bottom for maximum air flow efficiency according to the known concepts of aerodynamics.

It is of critical significance that the air flowing in chamber 8 have minimum turbulence and that friction be maintained at a minimum. These factors contribute to noise level and heat generation, both of which are undesirable. The features heretofore described are directed to providing an operating system where noise is reduced to a minimum and heat build-up is reduced.

It will thus be seen that the objects set forth above, among those made apparent from the preceeding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A levitationarium for air flotation of humans comprising a housing having an inner wall defining a levitation chamber, said levitation chamber defining a central vertical axis and having an air inlet at the lower end thereof and an air outlet at the upper end thereof, shroud means supported within said housing proximate said lower end of said chamber with blower means arranged therein for propelling air upwardly through said shroud means and said chamber, said shroud means having an air inlet at the lower end thereof and an air outlet at the upper end thereof communicating with said air inlet of said chamber whereby said propelled air flow can be established, said shroud means being spaced from said inner wall an amount sufficient to cause a flow of air by the operation of said blower means resulting from both the blower means operation in driving air and an induced suction flow being produced in the space around said shroud whereby an enhanced air flow is generated in said chamber, flow directing means arranged in said shroud above said blower means for inwardly directing the flow produced by the driving of air by said blower means toward said axis of said chamber, grating means extending transversely across the lower end of said levitation chamber above said shroud means for simultaneously allowing upward air flow created by said blower means to pass therethrough and for supporting standing users of said levitationarium thereon, annular platform means extending peripherally around said inner wall of said levitation chamber and which is air impervious for permitting users to stand clear of said upward air flow and from which users can dive toward the center of said chamber for being lifted by said upward air flow, and deflector means arranged below said annular platform means and movable between an operating position and a non-operating position whereby when said blower means is in operation, said deflector means is forced into said operating position for deflecting air flow away from said platform means to prevent air turbulence in proximity thereto.

2. The levitationarium as claimed in claim 1 wherein said blower means comprises a propeller mounted within said shroud coaxially with the levitation chamber, said flow directing means comprises a grid secured above said propeller which is substantially V-shaped in cross-section and sloped toward the center of said propeller, and a cone shaped member arranged on said grid above said propeller on the axis of rotation thereof positioned to prevent air turbulence resulting from a dead air space created above the center of said propeller when in operation.

3. The levitationarium as claimed in claim 1, wherein the spacing of said shroud means from said inner wall defines an annular space through which said upward air suction flow is created by said blower means.

4. The levitationarium as claimed in claim 3, wherein said housing includes an outer wall spaced from said inner wall and defining an air passage portion communicating the air outlet at the upper end of said levitation chamber and with the air inlet at the lower end of said levitation chamber, said air passage portion being constructed and arranged for closed circuit flow therethrough serially with the levitation chamber and said blower means.

5. The levitationarium as claimed in claim 1, wherein said deflector means is deformable, said deflector means being annular in shape and having inner and outer edges, said outer edge being secured adjacent said inner wall.

6. The levitationarium as claimed in claim 5, wherein said shroud means and said inner wall include a plurality of struts extending therebetween, said outer edge of said deflector means being secured adjacent said inner wall proximate said struts.

7. The levitationarium as claimed in claim 6, wherein the inner edge of said deflector means in its deflecting position is located inwardly of said platform when air is flowing through said annular space.

8. The levitationarium as claimed in claims 4, 5, 6 or 7, wherein said housing includes a toroidal core portion positioned around said inner wall inwardly of said air passage and forming a spectator-gallery externally of the inner wall and an access for the passage of users in and out of said levitation chamber through said inner wall, said inner wall including windows registering with the spectator-gallery and constructed and arranged for spectators viewing inside the levitation chamber.

9. The levitationarium as claimed in claims 1, 3, 4, 5, 6 or 7, wherein said housing includes a roof at the upper end thereof, said roof including an axial projection extending downward towards said chamber.

10. The levitationarium as claimed in claim 9, wherein said housing includes a base at the lower end thereof, said base including an axial projection extending upward towards said blower means.

11. The levitationarium as claimed in claim 10, wherein said axial projections of said roof and base provide for smooth, streamlined air flow through said levitationarium.

12. The levitationarium as claimed in claim 1, wherein said flow directing means includes deflector means in the center thereof positioned over the central portion of said blower means for eliminating dead air spaces at said center.

13. The levitationarium as claimed in claim 12, wherein said housing includes a toroidal core portion positioned around said inner wall inwardly of said air passage and forming a spectator-gallery externally of the inner wall and an access for the passage of users in and out of said levitation chamber through said inner wall, said inner wall including windows registering with the spectator-gallery and constructed and arranged for spectators viewing inside the levitation chamber.

14. The levitationarium as claimed in claim 12, wherein said housing includes a roof at the upper end thereof, said roof including an axial projection extending downward towards said chamber.

15. The levitationarium as claimed in claim 14, wherein said housing includes a base at the lower end thereof, said base including an axial projection extending upward towards said blower means.

16. The levitationarium as claimed in claim 15, wherein said axial projections of said roof and base provide for smooth, streamlined air flow through said levitationarium.

* * * * *